United States Patent
Çelik et al.

(10) Patent No.: US 12,388,495 B2
(45) Date of Patent: Aug. 12, 2025

(54) APPARATUS, SYSTEMS, AND METHODS FOR METASURFACE ASSISTED WIRELESS DATA CENTERS

(71) Applicant: KING ABDULLAH UNIVERSITY OF SCIENCE AND TECHNOLOGY, Thuwal (SA)

(72) Inventors: Abdulkadir Çelik, Thuwal (SA); Ahmed M. Eltawil, Irvine, CA (US)

(73) Assignee: KING ABDULLAH UNIVERSITY OF SCIENCE AND TECHNOLOGY, Thuwal (SA)

( * ) Notice: Subject to any disclaimer, the term of this patent is extended or adjusted under 35 U.S.C. 154(b) by 82 days.

(21) Appl. No.: 18/563,439

(22) PCT Filed: May 23, 2022

(86) PCT No.: PCT/IB2022/054806
§ 371 (c)(1),
(2) Date: Nov. 22, 2023

(87) PCT Pub. No.: WO2022/249032
PCT Pub. Date: Dec. 1, 2022

(65) Prior Publication Data
US 2024/0364388 A1 Oct. 31, 2024

Related U.S. Application Data

(60) Provisional application No. 63/192,205, filed on May 24, 2021.

(51) Int. Cl.
*H04B 7/04* (2017.01)
*H04W 28/02* (2009.01)
*H04W 28/10* (2009.01)

(52) U.S. Cl.
CPC .... *H04B 7/04013* (2023.05); *H04W 28/0273* (2013.01); *H04W 28/10* (2013.01)

(58) Field of Classification Search
CPC .. H04B 7/04013; H04B 7/1555; H04B 7/145; H04W 28/0273; H04W 28/10
See application file for complete search history.

(56) References Cited

U.S. PATENT DOCUMENTS

2016/0173199 A1   6/2016  Gupta et al.
2024/0250742 A1*  7/2024  Prasad ............... H04B 7/04013

OTHER PUBLICATIONS

Han, C., et al., "Terahertz Communications (TeraCom): Challenges and Impact on 6G Wireless Systems," arxiv.org, Cornell University Library, Dec. 12, 2029, pp. 1-8, XP081550624.

(Continued)

*Primary Examiner* — Sung S Ahn
(74) *Attorney, Agent, or Firm* — PATENT PORTFOLIO BUILDERS PLLC (57) ABSTRACT

A data center system having plural components including core switches and racks $R_i$, each rack $R_i$ having plural servers; a global controller configured to control a traffic flow to each rack of the plural racks $R_i$; plural reconfigurable intelligent surface, RIS, modules, a RIS module being configured to receive a first electromagnetic signal from a first component and emit a second electromagnetic signal toward a second component, the second electromagnetic signal carrying a same information as the first electromagnetic signal; and a local controller configured to adjust an emitting direction of the second electromagnetic signal by changing a current flow through the RIS module.

20 Claims, 10 Drawing Sheets

(56) References Cited

OTHER PUBLICATIONS

International Search Report in corresponding/related International Application No. PCT/IB2022/054806, date of mailing Aug. 23, 2022.
Liaskos, C., et al., "A New Wireless Communication Paradigm through Software-Controlled Metasurfaces," arxiv.org, Cornell University Library, Jun. 4, 2018, pp. 1-8, XP080887381.
Written Opinion of the International Searching Authority in corresponding/related International Application No. PCT/IB2022/054806, date of mailing Aug. 23, 2022.

* cited by examiner

APPARATUS, SYSTEMS, AND METHODS FOR METASURFACE ASSISTED WIRELESS DATA CENTERS

CROSS-REFERENCE TO RELATED APPLICATIONS

This application is a U.S. National Stage Application of International Application No. PCT/IB2022/054806, filed on May 23, 2022, which claims priority to U.S. Provisional Patent Application No. 63/192,205, filed on May 24, 2021, entitled "APPARATUS, SYSTEMS, AND METHODS FOR METASURFACE ASSISTED WIRELESS DATA CENTERS," the disclosures of which are incorporated herein by reference in their entirety.

BACKGROUND

Technical Field

Embodiments of the subject matter disclosed herein generally relate to a data center network and method for exchanging data, and more particularly, to a data center that uses one or more metasurfaces for establishing single- or multiple-hop line of sight links between various components within the data center.

Discussion of the Background

Data centers (DCs) are the main nodes of the existing communication infrastructure for storing and processing massive amounts of data generated or required by emerging technology trends such as fifth-generation (5G) networks, the Internet of Things (IoT), big data, cloud services, artificial intelligence, content providers, etc. These services have diverse quality of service (QOS) demands in terms of storage capacity, processing power, bandwidth, latency, etc. Such demands can be fulfilled either by centralized mega DCs, which are scaled up to thousands of servers, or by a network of distributed micro-DCs. Therefore, a scalable, resilient, and sustainable DC network (DCN) design is desirable in the industry to efficiently utilize network resources, minimize capital and operational expenditures, and adapt network topology to dynamically changing traffic patterns.

Figure 1:
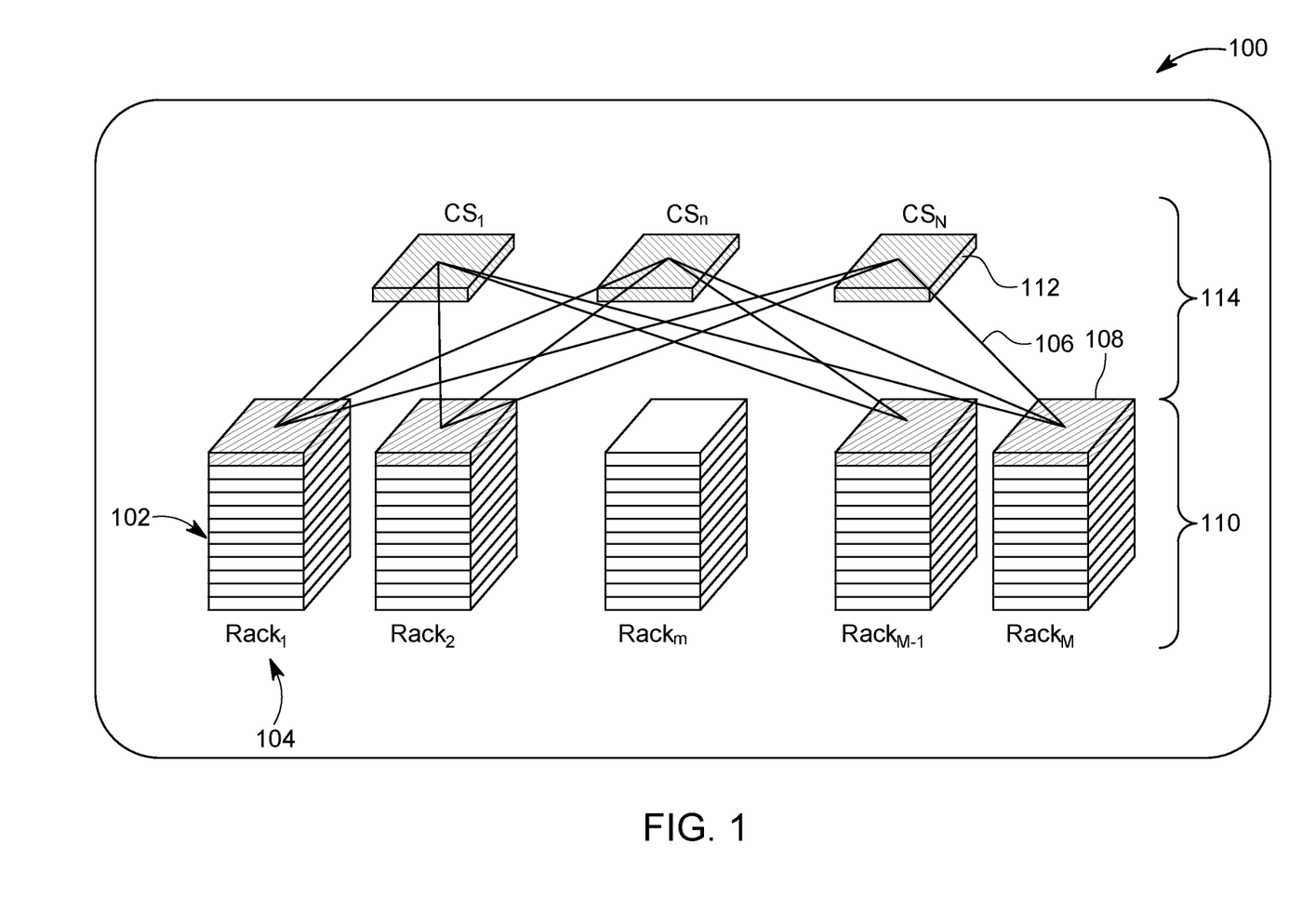
FIG. 1 is a schematic diagram of a traditional data center that uses wired communication links for intra-racks exchanges.

The current DCs 100 are constructed based on a hierarchical tree topology, as illustrated in FIG. 1, where plural servers 102 are placed inside racks 104, and intra-rack connections 106 within the DC ensure that data communication occurs traversing the top-of-rack (ToR), i.e., edge switches (ESs) 108, in the lower layer 110. The lower layer may include M racks 104 and M edge switches 108, where M is any natural number. The inter-rack communication is established by linking ESs with aggregate switches (ASs) in the middle layer (not shown). The ASs are further connected through core switches (CSs) 112 in the top layer 114. The top layer 114 or spine layer may include N CSs, where N is any natural number. More recently, this three-layer hierarchical architecture is reduced to a spine-leaf approach where the ToR switches 108 in the leaf layer 110 are connected to all CSs 112 in the spine 114, as shown in FIG. 1.

Currently, all the connections 106 are established via fixed and uniform capacity cables (e.g., coaxial, twisted-pair, fiber, etc.), which yields a multi-root tree. The tree branches nearer the top layer 114 require more powerful links and switches and make the CSs 112 the DCN system 100's bottleneck under heavy traffic conditions. As a result, inter-rack communication experiences a throughput much lower than the actual available bandwidth, i.e., oversubscription. Furthermore, measurements and analysis of the real-life DCN traffic characteristics reveal that some applications generate unpredictable traffic patterns and asymmetrical traffic distributions. This unbalanced traffic is mainly caused by hotspots that contain common data required by many ongoing jobs in several DCN entities. The DCN traces also show that only 60% of the edge and core links are active at a time and utilization of 95th percentile of aggregation links is below 10%.

Thus, it is challenging for wired DCN systems 100 to conform with this unpredictable and unbalanced traffic because of the fixed hierarchical topology and the inflexible links with uniform capacity. Designing DCNs to cope with sporadic peak performance is not a preferable solution due to the prohibitive capital and operational expenditures. At this point, the high bandwidth wireless technologies (e.g., millimeter-wave (mmWave) communications between 30 and 300 GHz, terahertz (THz) communications between 0.3 THz and 10 THz, and optical wireless communications (OWC) above 300 THz, etc.) have been recently considered as an alternative solution. The oversubscription and congestion problems in the DCs can be indeed overcome by offloading lagging traffic to on-demand wireless links. Even though these wireless technologies' abundant bandwidth suits the typical high QoS demand within and across DCNs, they share a common critical shortcoming of having a high penetration loss and requiring Line-of-Sigh (LoS) links to operate properly, which becomes more stronger as the operational frequency increases. Establishing LOS links within a traditional DC is especially cumbersome because the racks 104 are packed into rows (see FIG. 1) to best utilize the available indoor space. This means that a LOS link between a first rack $Rack_2$ and a second rack $Rack_{M-1}$ is not practical with the current technologies as many other racks are located between these two racks.

Therefore, the early research and development attempts on conceptualizing the wireless DCNs (WDCNs) have mostly focused on provisioning LOS links by changing the rack deployment layout or designing different shape of racks (e.g., cylindrical or spherical) instead of commonly used rectangular prism shaped ones, which result in underutilization of the available space and may yield extra colling costs. The OWC-based WDCNs designs have also considered different lens arrangements and mirrors deployed on walls and ceilings. Also, there exists other methods that exploits micro-electro-mechanical systems (MEMs) to steer beams to establish LOS links between various racks. All these approaches are either not reconfigurable or reconfigurable but not agile enough for responding to emerging oversubscriptions and congestions in a timely manner.

Thus, there is a need for a new DC system that is capable of quickly and inexpensively establishing LOS links between separated racks for accommodating the peak traffic within the DC.

BRIEF SUMMARY OF THE INVENTION

According to an embodiment, there is a data center system having plural components including core switches and racks $R_i$, each rack $R_i$ having plural servers, a global controller configured to control a traffic flow to each rack of the plural racks $R_i$, plural reconfigurable intelligent surface, RIS, modules, a RIS module being configured to receive a first electromagnetic signal from a first component and emit a second electromagnetic signal toward a second component, the second electromagnetic signal carrying a same information as the first electromagnetic signal, and a local controller configured to adjust an emitting direction of the second electromagnetic signal by changing a current flow through the RIS module.

According to another embodiment, there is a method for establishing a new, wireless, direct line communication link within a data center system. The method includes determining in a global controller that a data exchange bandwidth between first and second components of the data center system is above a given threshold, wherein the first and second components include core switches and racks $R_i$, each rack $R_i$ having plural servers, calculating an end direction of the new, wireless, direct line communication link between the first and second components, selecting a plural reconfigurable intelligent surface, RIS, module from plural RIS modules distributed around the first and second components, based on calculations performed by the global controller, to support the new, wireless, direct line communication link, and configuring the selected RIS module with a local controller so that a received first electromagnetic signal from the first component is reemitted as a second electromagnetic signal toward the second component, the second electromagnetic signal carrying a same information as the first electromagnetic signal.

BRIEF DESCRIPTION OF THE DRAWINGS

For a more complete understanding of the present invention, reference is now made to the following descriptions taken in conjunction with the accompanying drawings, in which.

DETAILED DESCRIPTION OF THE INVENTION

The following description of the embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to a DC system that stores and provides data on demand. However, the embodiments to be discussed next are not limited to a DC system, but may be applied to any system that needs to exchange data internally, in a quick and inexpensive way, in a wireless manner.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

According to an embodiment, one or more reconfigurable intelligent surfaces (RIS), also called a metasurface herein, are distributed within the DC and configured and controlled by a global controller to establish on demand LOS links between any racks present in the DC or any two components of the DC, for example, a rack and a core switch, or two core switches. According to this or another embodiment, single-hop or multi-hop LOS links are achieved by the deployed metasurfaces on the walls, ceiling, and/or racks within the DC environment. The metasurfaces can be electronically tuned to manipulate the electromagnetic wave properties (e.g., polarization, amplitudes, phase, etc.) in a wide frequency range, between microwave and visible light. Considering the acclimatized and immobile DCN environment, this controllable wireless environment can be promptly configured to correspond to pre-determined scenarios, which appear at a given time. Further, considering the availability of traffic pattern history and distributions, the metasurface configurations can be pre-calculated by the global controller to match various emerging oversubscription and congestion events in a timely manner.

Figure 2:
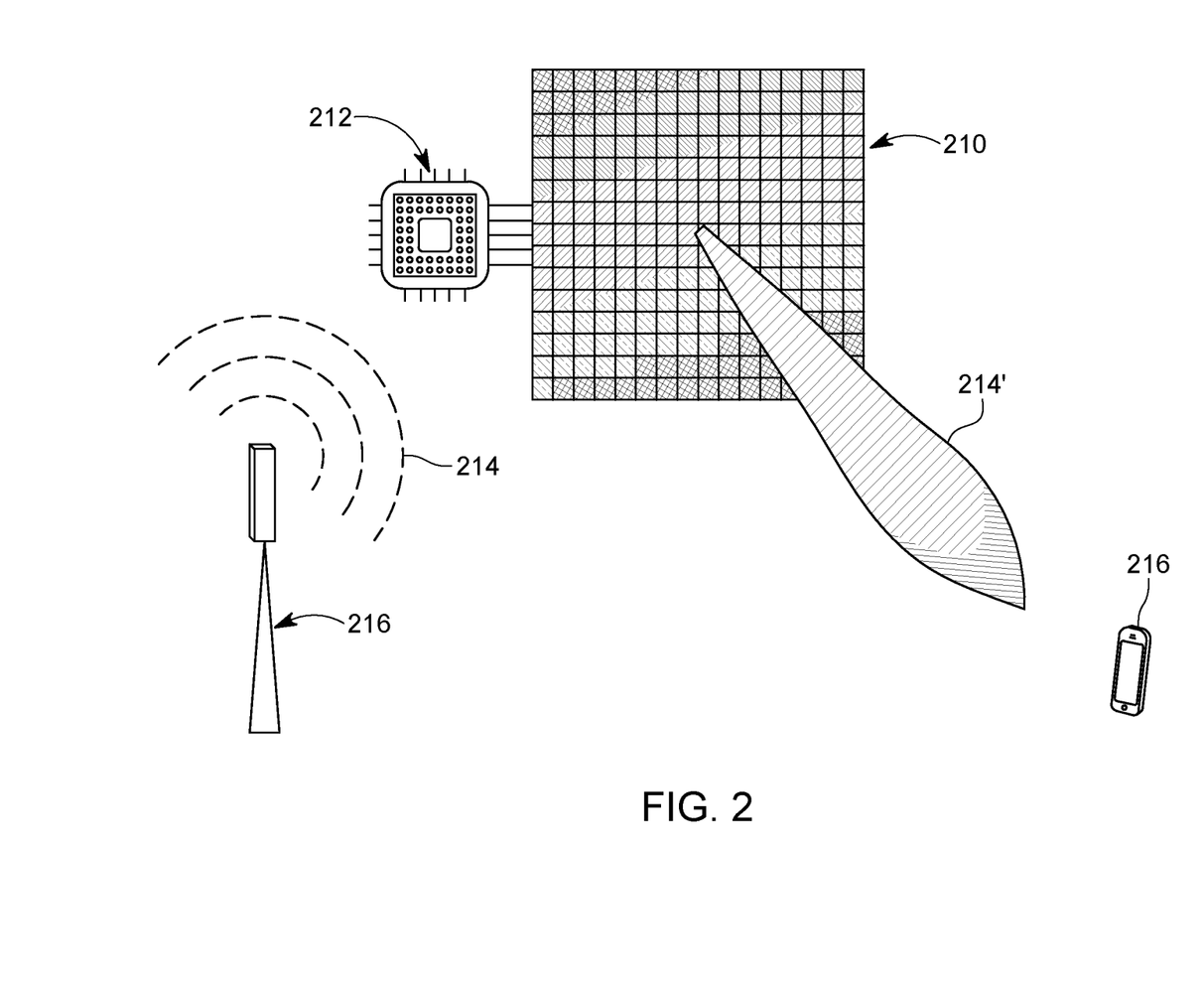
FIG. 2 schematically illustrates a wireless communication link between two components of a data center by using a metasurface.

As shown in FIG. 2, a metasurface module 210 is configured to receive an electromagnetic or optical signal 214, which is generated by a server, base station, transmitter, router, smart device, personal computer, mobile device 216, and to transmit a signal 214' to a receiver 216, where the transmitted signal 214' carries the same information as the first electromagnetic signal 214. The transmitted signal 214' may be a simple reflection of the incoming signal 214, for example, for a passive metasurface, or a newly emitted signal that mimics the incoming signal 214, for example, for an active metasurface. A more detailed description of a metasurface can be found in Brizi, D., Monorchio, A. Magnetic metasurfaces properties in the near field regions. *Sci Rep* 12, 3258 (2022).

The receiver 216 may be any known electronic device, e.g., a component of a DC, an appliance or other electronics. A local controller 212 of the metasurface module 210 is configured to control each atom (to be defined and discussed later) of the metasurface so that a direction of the transmitted signal 214' coincides with a direction of the receiver 216. In other words, the local controller 212 knows the location of the receiver 216 and adjusts the properties of the atoms of the metasurface so that the incoming signal 214 is mostly transmitted as signal 214' to the receiver 216. Note that under the traditional law of optics, in which the incidence and reflection angles on an optical beam on a reflecting surface are equal, the incidence angle of the incoming signal 214 may be different from the transmitted angle of the transmitted signal 214' when an active metasurface is used. This means that the metasurface module 210 is more than an optical or electromechanical "mirror" that simply reflects an incoming signal.

Figure 3:
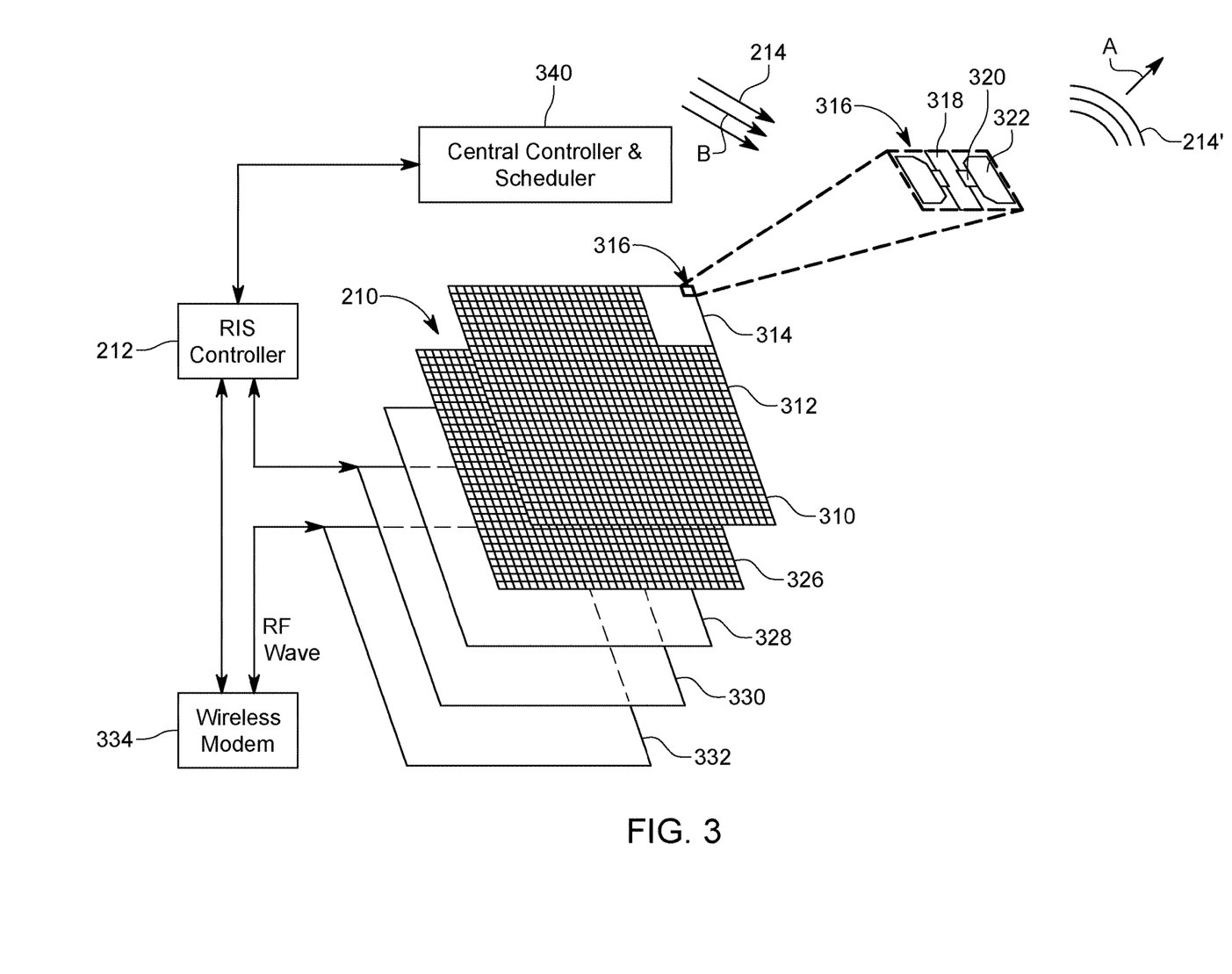
FIG. 3 schematically illustrates the structure of a metasurface and associated controller.

In this regard, a metasurface is constructed as a multilayer printed circuit board by using commercially available electronic components, for example diodes, as illustrated in FIG. 3. This approach paves the way for low-cost, small-form factor, and energy-efficient solutions, enabling a software-defined WDCN environment. The metasurface module 210 includes, in this embodiment, a metamaterial layer 310 made of plural RIS blocks 312. Each RIS block 312 is made of plural RIS elements 314 and each RIS element 314 is made of atoms 316. Each block, element, and atom may be individually controlled by the local controller 212. An atom 316 includes a continuous strip 318 connected by electronic devices 320, e.g., diodes, to metamaterial patches 322 (for example, metallic patches and/or graphene whose shapes are designed based on the signal to be emitted requirements). An atom may include plural electronic devices and metamaterial patches. By constantly and independently controlling the current flow through the diodes 320, the atom may be controlled to emit the desired signal 214' along a desired direction A, independent of the direction B of the incoming signal 214. Thus, each atom 316 acts as a small aerial that can be configured (electronically) to emit a desired signal 214'. In addition, discrete metasurface control of the EM properties of the transmitted signal is achieved by turning on and off the diodes at each atom. The on-off pattern of the diodes determines the overall EM properties of the discrete metasurfaces. The active metasurface layer 310 can serve as a transmitter, receiver, and/or reflector. The term "active" refers herein to the power consumed for emitting radio frequency (RF) signals 214' in the transmitter mode or amplifying impinging RF signals towards the predetermined direction in the reflector mode.

The metamaterial layer 310 is formed on a sensor-actuator layer 326, which includes electrical components. The sensor-actuator layer 326 may be based on feed phase diversity and varactors diodes to assist each atom 316 in the beam-forming process. Thus, the sensor and actuator layer 326 is also controlled by the local controller 212. An insulation layer 328 is placed under the sensor-actuator layer 326 to electrically insulate the atoms from stray signals from a control layer 330, which is part of the metasurface module 210. The control layer 330 may include various electrical connections and/or electronics for supplying electrical power to each atom 316. The control layer 330 is connected to the local controller 212 for receiving the instructions that are addressed to each atom 316. A communication interface layer 332 may be used as the base of the metasurface module 210 and this layer ensures that the communication between the local controller 212 and each atom 316 is possible and also can be performed independently for each atom. The communication interface layer 332 may also be connected to a wireless modem 334 for receiving wireless signals from other modules or switches or servers or other components of the data center.

The local controller 212 is configured to orchestrate the sensor-actuator layer 326 through the control layer 330. The local controller 212 is responsible for running specific calculations and algorithms to obtain a specific control layer configuration, which yields the desired EM behavior of the transmitted signals 214'. Although the local controller 212 manages the atom metasurfaces independently, it may receive one or more objective (e.g., the beam steering direction or destination) and/or one or more constraints (e.g., the mitigation of interference that may occur on already established links) sets from a central controller and scheduler 340. Such a central controller 340 may coordinate the activity of all the metasurface modules 210 that are present in a single DC system 100.

The local controller 212 may also coordinate with the wireless modem 334, especially to fulfill channel training, channel sounding, and channel estimation tasks. In one application, the metamaterial layer 310 and the sensor-actuator layer 326 are jointly manufactured and isolated from the bottom layers' electromagnetic behaviors utilizing a shield material, i.e., the isolation layer 328. In the transceiver mode, the transmitted RF signal 214' and the received signal 214 are handled through the RF wave distribution network built on the communication interface layer 332. In the transmitter mode, for example, the reference wave fed by the wireless modem 334 into the distribution network is transformed into an object wave 214' towards the desired direction A, which is possible by changing the surface pattern accordingly.

While FIG. 3 shows an active metasurface module 210, it is possible to use a passive metasurface module, which is similar to the module 210, but its power consumption is much smaller, as such a metasurface behaves only as a reflector, scatterer, absorber, or polarizer, based on the underlying RIS configuration pattern. The main advantage of passive metasurface modules is that their power consumption is just at the level of USB and Power over Ethernet (POE) systems. In this respect, a passive metasurface module is a power-and-cost-efficient way of controlling the wireless environment in a full-duplex mode.

Figure 4:
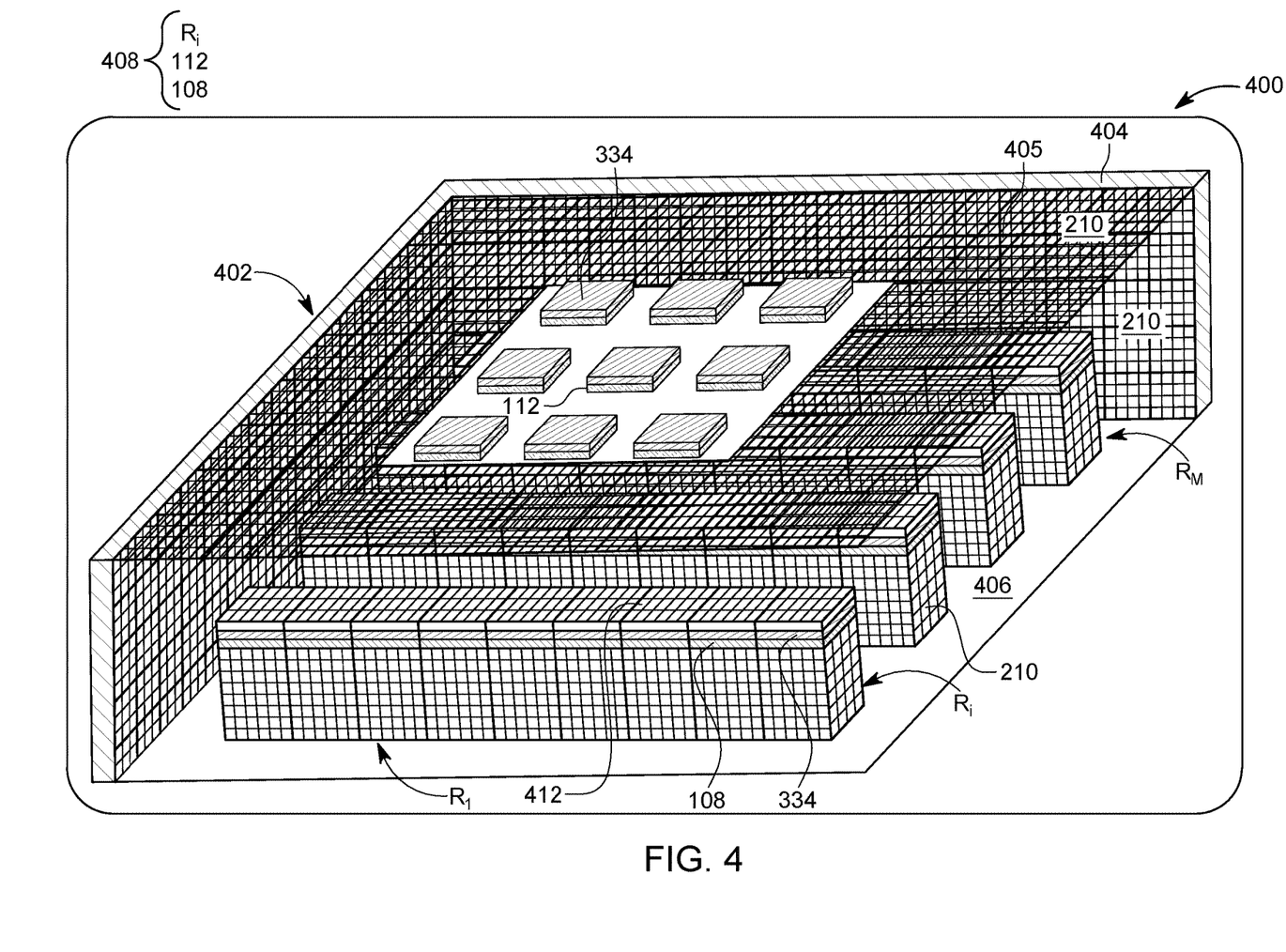
FIG. 4 schematically illustrates a novel data center that uses plural metasurfaces for generating, on-demand, direct communication links between two components of the data center.

Based on the above noted metasurface module, the following embodiments contemplate using active and/or passive metasurface modules within a DC, as well as to other technologies in the future. As shown in FIG. 4, a DC system 400 may be located within a housing 402 (e.g., a room) having plural walls 404 that define a chamber 406. Plural components 408 are distributed inside the chamber 406, which may be a closed chamber, for example, plural racks $R_1$ to $R_M$ are located one next to the other on the floor, core switches 112 are located close to or onto the ceiling. Other components may include the TOR switches 108, various modems that are discussed later, RIS modules, RIS antenna arrays, etc. The racks may have any shape, i.e., cube, pyramid, cylinder, etc. Each rack includes one or more servers (not visible as they are covered in the figure by the metasurface modules 210). Each rack $R_i$ is equipped with one or more metasurface modules 210, which may be directly placed, physically, on the sides and/or at the top of the rack. FIG. 4 shows the entire side surface of the rack $R_i$ being covered in metasurface modules 210. However, it is possible that only a part of the side surface is covered with the modules 210. The RIS elements 312 of these rack-mounted active RIS modules 210 can be accessed by the servers 102 and ToR switches 108. Likewise, the walls 404 and ceiling 405 of the housing 402 may be partially or totally covered with RIS modules 210, some of which are active and can be accessed by the core switches 112. Each core switch 112 may be connected to a corresponding modem 334. Note that the RIS modules 210, core switches 112 and modems 334 placed on the ceiling 405 in FIG. 4 are located within the chamber 406. In one application, the core switches 112 and the modems 334 may be located outside the chamber 406 and only the ceiling RIS modules 210 are located within the chamber 406, on the ceiling. In one application, the top of one or more of the racks $R_i$ are covered by one or more RIS or multiple-input multiple-output (MIMO) antenna arrays 412. Although FIG. 4 shows the entire top of each rack being covered by the RIS or MIMO antenna array 412, it is possible that only a part of the top of the rack is covered by such array.

Figure 5:
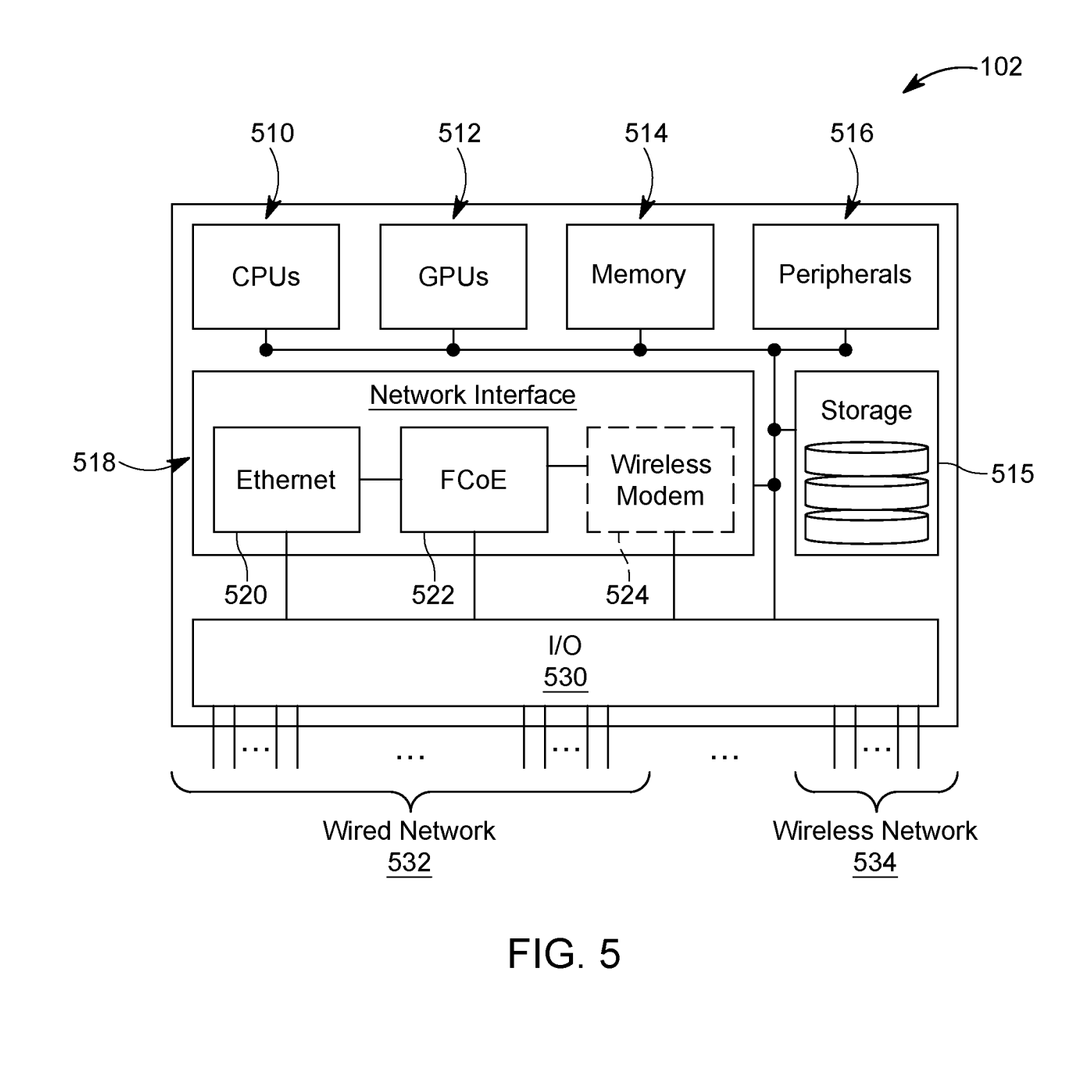
FIG. 5 schematically illustrates the configuration of a server of the data center.

As noted above, each rack $R_i$ includes one or more servers 102, which are covered in the figure by the modules 210. The configuration of a server 102 is shown in FIG. 5 and includes one or more central processing units (CPUs) 510, one or more graphical processing units (GPUs) 512, memory 514 and storage blocks 515, peripherals 516, and a network interface 518. The hardware specifications of these sub-systems are determined based on the underlying applications, i.e., content delivery, large data, artificial intelligence, data base management, gaming, cloud computing, virtualization, high-frequency and ultra-fast trading, etc. The available technology in the network interface 518 determines the class of servers, i.e., wired (requires ethernet 520, fiber channel over ethernet (FCOE) 522), wireless (requires a modem 524), or hybrid (requires both components). An input/output interface 530 ensures the communication with a wired network 532, a wireless network 534, or both of them.

Figure 6:
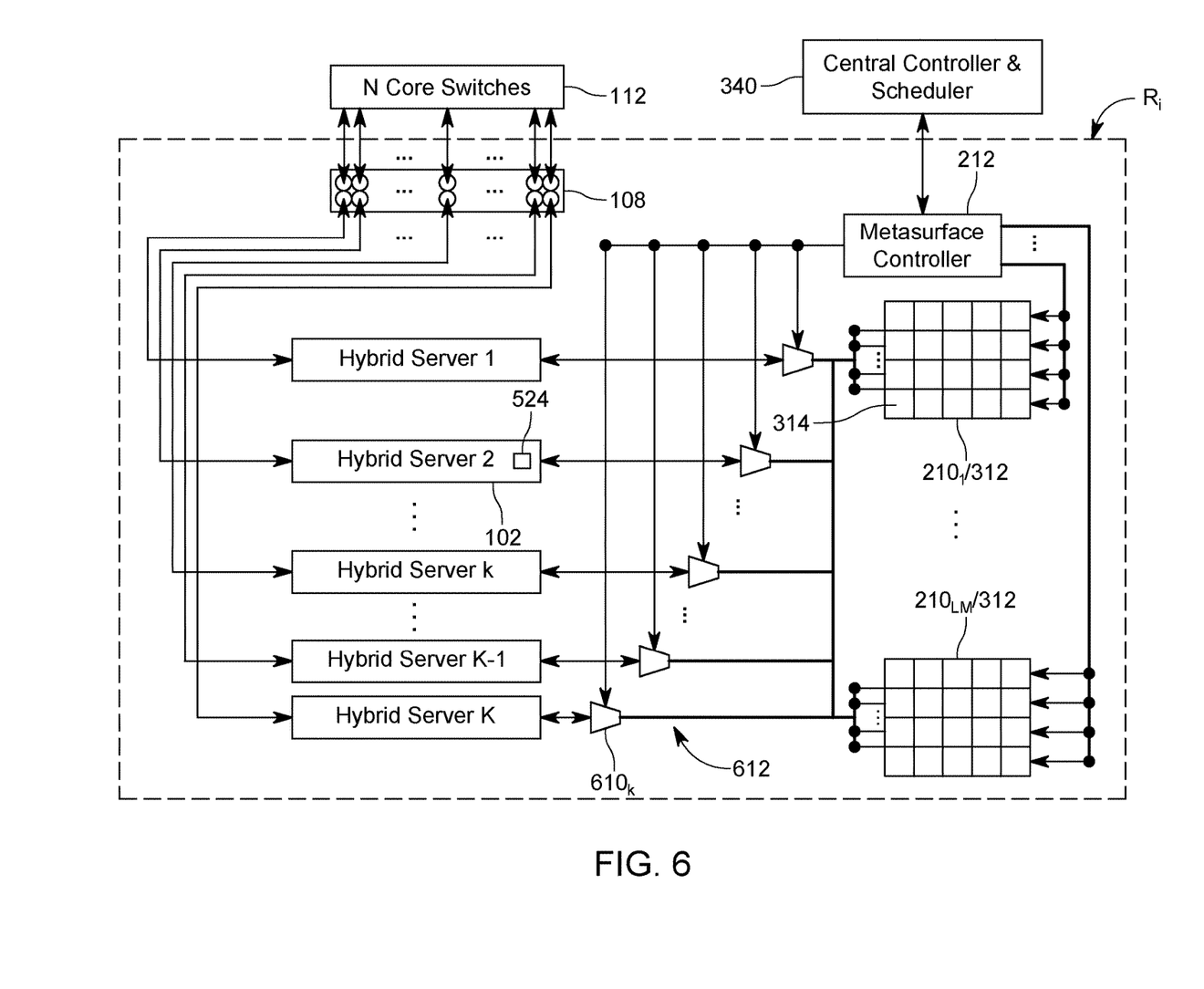
FIG. 6 schematically illustrates the configuration of a rack and associated metasurfaces for establishing direct communication links between various parts of the rack or various parts of different racks or various elements of the data center.

One internal structure of a rack $R_i$ for supporting the metasurface based internal communication is shown in FIG. 6. Note that FIG. 4 shows only the external configuration of the rack $R_i$ while FIG. 6 show its internal configuration. Rack $R_i$ may have K hybrid servers 102 and $L_m$ RIS modules 210, a RIS module 210 being illustrated in FIG. 3. The hybrid servers 102 are wired to $ToR_m$ switches 108, which are also wired to N core switches 112. The RF output of the wireless modems 524 (only one shown for simplicity) of the hybrid servers 102 are connected to corresponding active RIS modules $210_1$ to $210_{Lm}$ or blocks 312 of a single module 210, to use them as transceivers. The servers 102 can simultaneously use several RIS elements 312 on different modules 210 or blocks 314 through plural demultiplexer (DeMUX) $610_k$, which form a demux network 612. The demux network 612 may be controlled in this embodiment by the local metasurface controller 212 of the rack. The metasurface controller 212 is also responsible for reconfiguring the RIS elements 314 of each block 312 based on instructions coming from the central controller and scheduler 340, which orchestrate both wired and wireless networks, as well as the wireless propagation environment. Note that FIG. 4 shows the blocks 312 or modules 210 distributed on the outside walls of the racks, so that they form a cover for the rack. This is so because a LOS link is desired to be established between various blocks/modules of the plural racks to establish electromagnetic communication within the housing 406.

Figure 7:
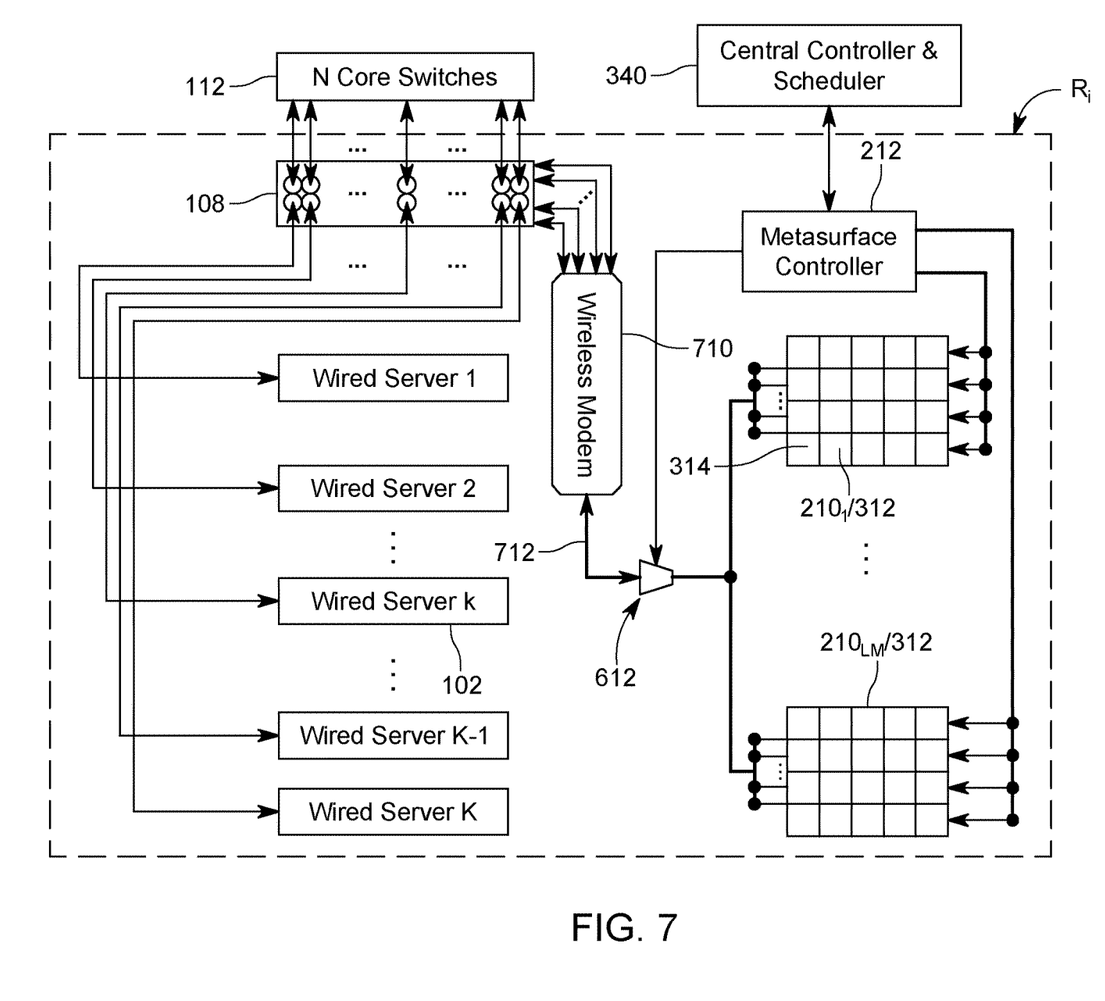
FIG. 7 schematically illustrates another configuration of a rack and associated metasurfaces for establishing direct communication links between various parts of the rack or various parts of different racks or various elements of the data center.
Figure 8:
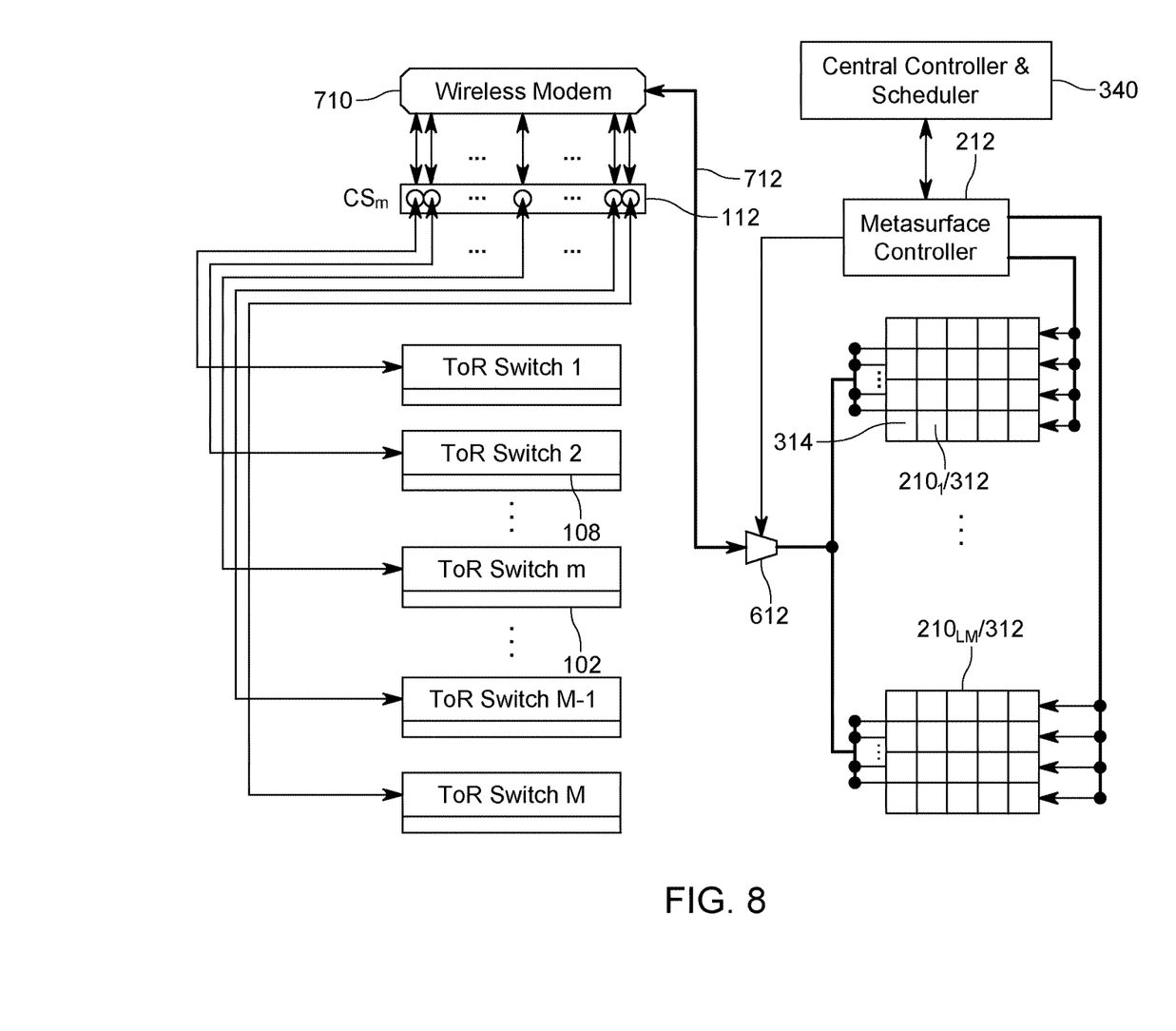
FIG. 8 schematically illustrates yet another configuration of a rack and associated metasurfaces for establishing direct communication links between various parts of the rack or various parts of different racks or various elements of the data center.

Another possible internal structure of a rack $R_i$ for supporting the metasurface based internal communication is shown in FIG. 7. This configuration shows each rack $R_i$ having K wired servers, which are connected to a hybrid ToR switch 108. The ToR switch 108 is wired to N core switches 112 and also to $L_m$ RIS modules 210 or blocks 312 through a wireless modem 710, i.e., using a wireless channel/link 712. In this way, the ToR switch 108 can offload some of the inter-rack traffic through the wireless links 712 established with the blocks 312 or modules 210. The wireless modem 710 may be connected to a demux network 612, as the one illustrated in FIG. 6, for independently and autonomously controlling each module 210 or block 312 or element 314. Note that the configurations shown in FIGS. 6 and 7 can be further extended to cases in which the racks are purely wired or wireless servers and to TOR switches. The embodiment shown in FIG. 8 illustrates a hybrid CS configuration in which the core switches 112 are connected to the wireless modem 710 and the ToR switches 108 are placed on each rack $R_i$. This configuration in which the hybrid CS switch 112 is connected to M wired ToR switches 108 and $L_n$ RIS blocks 312 can be extended to the case where some or all of the ToR switches 108 are in the hybrid form.

Figure 9:
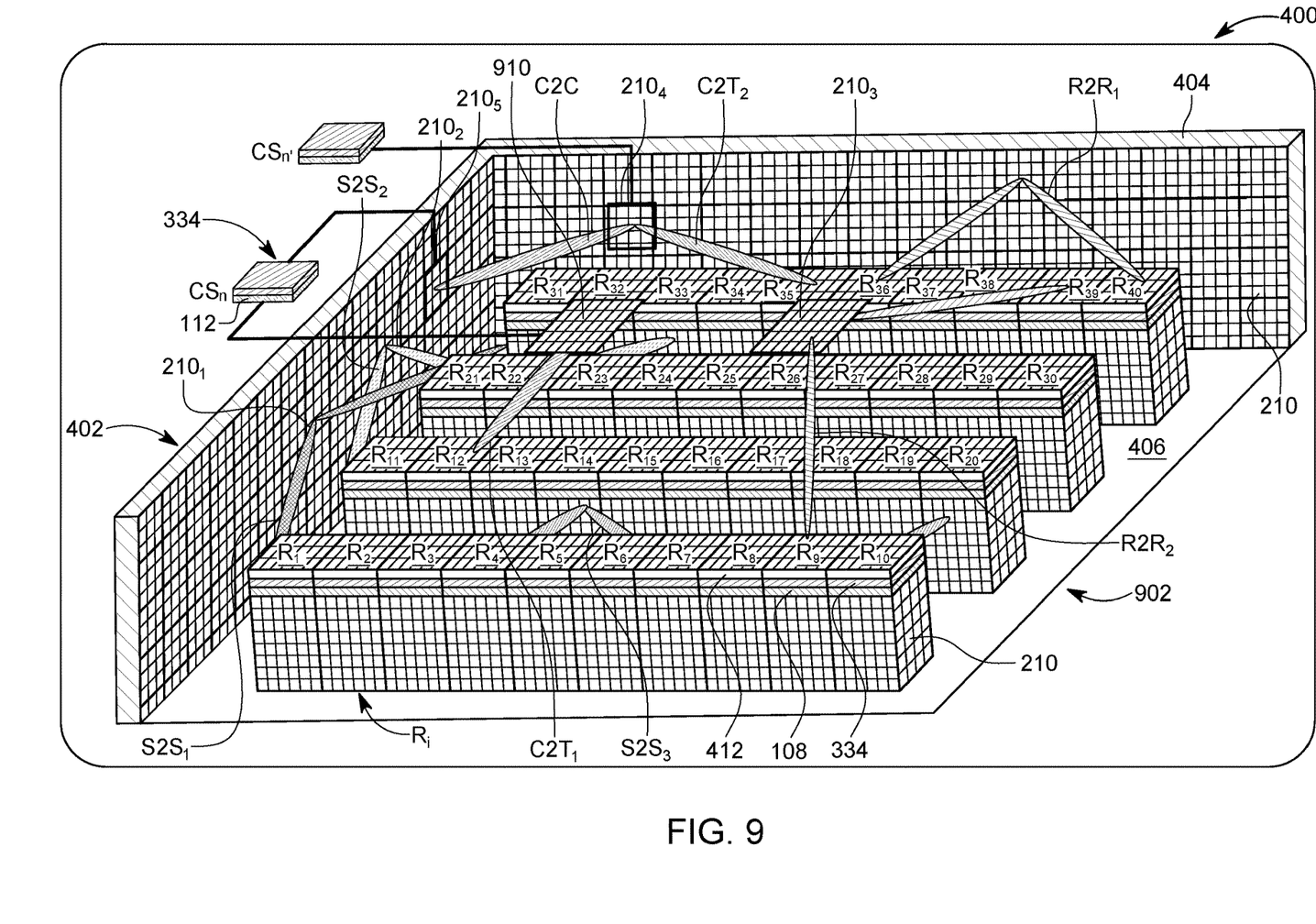
FIG. 9 schematically illustrates various possible direct communication paths between the various elements of the data center.

With the configurations discussed above, various LoS links can be established within a DC system for facilitating inter-rack communication. This communication may be implemented for any of the bandwidth wireless technologies, e.g., millimeter-wave (mmWave) communications between 30 and 300 GHZ, terahertz (THz) communications between 0.3 THz and 10 THz, and optical wireless communications (OWC) above 300 THz, etc. FIG. 9 shows the beamforming among the plural servers, ToR switches and core switched for the DC system 400 when located in a single housing 402.

In this embodiment, different from the embodiment shown in FIG. 4, there are 40 racks $R_i$, with "i" being an integer between 1 and 40. Groups of 10 racks are placed next to each other to form a row 902, and there are 4 such rows in the figure. Each group of 10 racks is fully covered, on the side surface, with the RIS modules 210. Each rack has a RIS or MIMO antenna array 412 on its top surface. The RIS modules 210 are shown coating the entire surface area of the walls 404 of the housing 402, which can be a chamber. At least one ceiling RIS module 210 is also present and is located above the racks $R_i$. A ceiling RIS or MIMO antenna array 910, similar in structure to the RIS or MIMO antenna array 210, is also present and attached on the ceiling of the housing, and in electrical contact with a core switch 112.

A first link $S2S_1$, between a server of the rack R1 and a server of the rack $R_{31}$, is established over a RIS module $210_1$ mounted on the wall 404 of the housing 402, as shown in FIG. 9. Thus, the LoS link $S2S_1$ is capable in this configuration to support on-demand, wireless, direct communication between two servers from two different racks in the same DC system 400. In this regard, note that the creation of any LOS link is established by the local controller 212 only when the global controller 340 requires. A second link $S2S_2$, between a server of the rack R11 and a server of the rack R33, is established over a first RIS module 2102 mounted on the wall 404 and a second RIS module (not visible in the figure) mounted over another rack R22. Thus, for the second link $S2S_2$, two different RIS modules are employed for establishing the 3 LOS links that form the communication channel. Further, FIG. 9 shows a third server to server link $S2S_3$, between the rack $R_3$ and the rack R20. For this link, only RIS modules located on another rack than the rack that holds the communicating servers are used. These three examples indicate that any two servers in the DC system 400 may be directly connected to each other, over single- or multi-loop LoS wireless links S2S, by using only passive and/or active RIS modules 210, which are distributed over the wall and/or ceiling of the enclosure and/or the racks themselves. Each link S2S may experience one or more reflections or retransmissions from the RIS modules. For these cases, the signals are emitted and received by the servers themselves, for example, by optical modems associated with each server (see, for example, modem 524 in FIG. 6).

In addition to the server to server links, it is possible to have ToR switches links R2R, for example, a first link $R2R_1$ between ToRs of corresponding racks R36 and R40. For these cases, the signals are emitted and received by the ToR switches 108 themselves, or by optical modems associated with these switches (see, for example, modem 710 in FIG. 7). FIG. 9 also shows a second link $R2R_2$, between the corresponding ToRs of the rack R9 and rack R39, where the RIS block 2103 facilitating the direct, wireless communication link is mounted on the ceiling of the housing.

It is further possible to establish links C2T between a core switch 112 and a ToR switch 108. FIG. 9 shows a first such link $C2T_1$ established between the core switch $CS_n$ and rack R12 via the RIS antenna array 910, which is located on the ceiling of the housing 402. Note that the RIS antenna array 910 is wired to the core switch $CS_n$ in this embodiment. Another core switch to TOR switch link $C2T_2$ is established between another core switch $CS_{n'}$ and rack R35. The core switch $CS_{n'}$ is wired to a RIS block or RIS antenna array 210$_4$, which is located on the wall of the housing 402 while the ToR switch of the rack R35 may be wired to its modem 710 (see FIG. 7).

Furthermore, it is also possible to establish a link C2C directly between a first core switch $CS_n$ and a second core switch $CS_{n'}$ as shown in FIG. 9. For this case, each core switch is electrically connected to a corresponding RIS module 210$_4$ and 210$_5$, and these modules are located on the walls 404 of the housing 402. For this case, the RIS modules may be passive elements. FIG. 9 shows that it is possible, with the RIS modules 210, to achieve on-demand, direct, wireless communications between any two servers from different racks, any two servers from the same rack, any two ToR switches from different racks, any ToR switch and any core switch, and any two core switches. All these links may be implemented independent of the tree structure of the switches of the DC system 400, to alleviate the oversubscribing experienced by the traditional DC systems. In other words, these links are established only when the wired channels become full. Because the traffic within a given DC system exhibits a pattern over time, the central controller 340 can learn what new links need to be established at a given time of the day and between what components, and thus, the central controller 340 can control the RIS modules 210 to establish the desired links. As the traffic pattern changes, the central controller 340 may include more or less RIS modules 210 to enhance the existing communication links to cope with the increased data traffic. In other words, the system described herein is very flexible, can respond to data traffic changes by creating direct wireless links between various components of the DC system, it is easy to be retrofitted to the existing data centers, and is inexpensive as the cost of the RIS modules is not high. As soon as the traffic volume subsides, these wireless links may be disabled.

Figure 10:
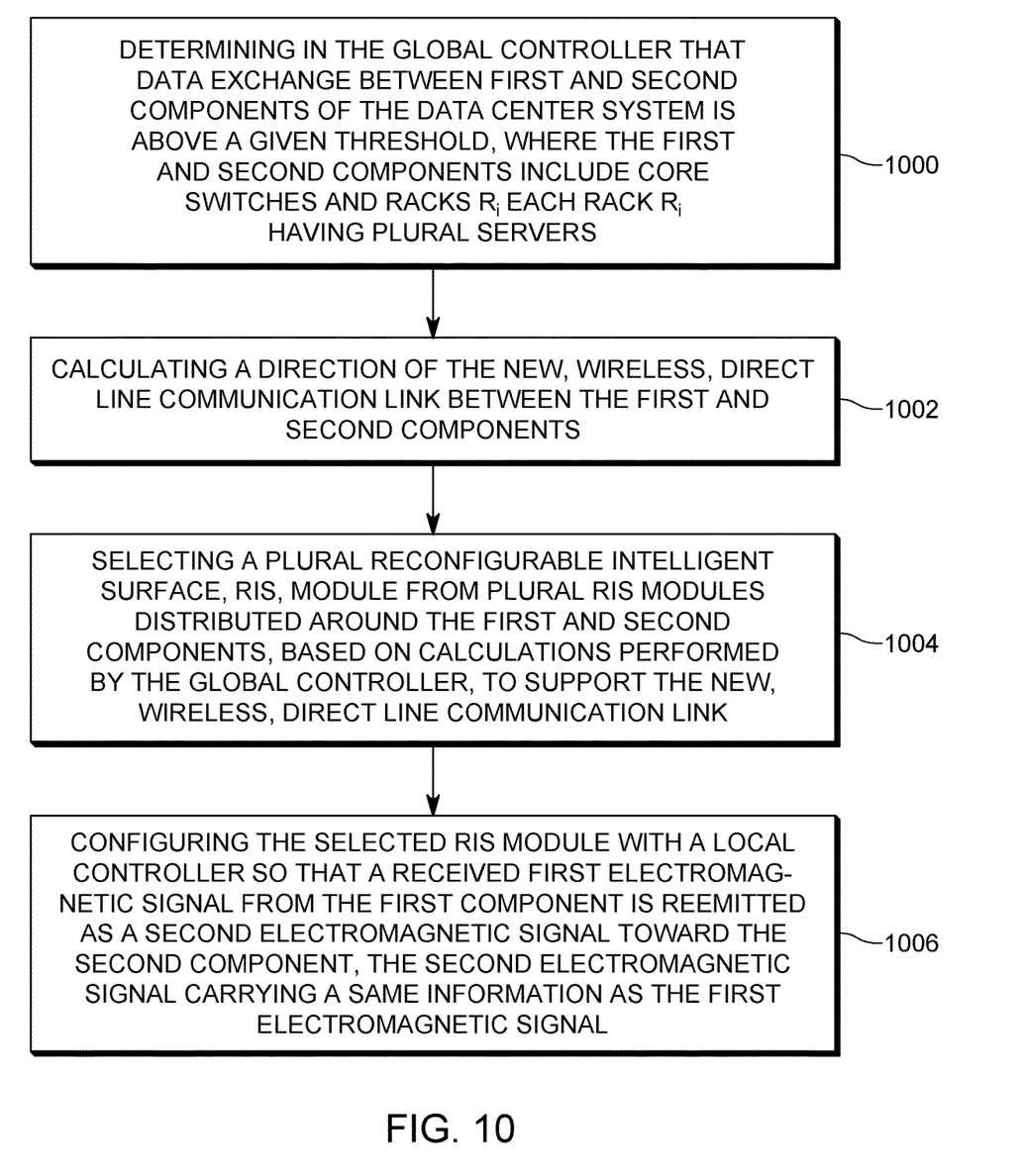
FIG. 10 is a flow chart of a method for establishing direct communication paths between the various elements of the data center.

A method for establishing a new, wireless, direct line communication link within a data center system 400 is now discussed with regard to FIG. 10. The method includes a step 1000 of determining in the global controller 340 that data exchange between first and second components 408 of the data center system 400 is above a given threshold, where the first and second components include core switches and racks $R_i$, each rack $R_i$ having plural servers. The method may further include a step 1002 of calculating a direction of the new, wireless, direct line communication link between the first and second components, a step 1004 of selecting a plural reconfigurable intelligent surface, RIS, module from plural RIS modules distributed around the first and second components, based on calculations performed by the global controller, to support the new, wireless, direct line communication link, a step 1006 of configuring the selected RIS module with a local controller so that a received first electromagnetic signal 214 from the first component is reemitted as a second electromagnetic signal 214' toward the second component, the second electromagnetic signal carrying a same information as the first electromagnetic signal.

The selected RIS module may be located on a wall that defines a housing that hosts the plural components, or on a ceiling that defines a housing that hosts the plural components, or on a rack that is not associated with the first and second components, or on any combination of the above elements. In one application, the first component is a first server and the second component is a second server, different from the first server. In another application, the first component is top-of-rack switch of a first rack and the second component is a top-of-rack switch of a second rack. In yet another application, the first component is top-of-rack switch of a first rack and the second component is a core switch. In still another application, the first component is a first core switch and the second component is a second core switch. In one embodiment, the RIS module includes plural atoms, each atom including a diode and graphene, and the local controller is configured to control a current through the diode of each atom so that the graphene of the atoms emits the second electromagnetic signal along the direction calculated by the global controller.

The disclosed embodiments provide a data center equipped with metasurface modules that can be configured to establish on-demand, direct, wireless communication links between various components of the data center to relieve a high traffic existing through the dedicated wired links of the data center. It should be understood that this description is not intended to limit the invention. On the contrary, the embodiments are intended to cover alternatives, modifications and equivalents, which are included in the spirit and scope of the invention as defined by the appended claims. Further, in the detailed description of the embodiments, numerous specific details are set forth in order to provide a comprehensive understanding of the claimed invention. However, one skilled in the art would understand that various embodiments may be practiced without such specific details.

Although the features and elements of the present embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A data center system comprising:
plural components including core switches and racks $R_i$, each rack $R_i$ having plural servers;
a global controller configured to control a traffic flow to each rack of the plural racks $R_i$;
plural reconfigurable intelligent surface, RIS, modules, a RIS module being configured to receive a first electromagnetic signal from a first component and emit a second electromagnetic signal toward a second component, the second electromagnetic signal carrying a same information as the first electromagnetic signal; and
a local controller configured to adjust an emitting direction of the second electromagnetic signal by changing a current flow through the RIS module.

2. The system of claim 1, wherein the global controller is configured to select the first and second components based on a need of additional communication bandwidth, and identify a RIS module from the plural RIS modules that supports a new, wireless, direct line communication link between the first and second components.

3. The system of claim 2, wherein the selected RIS module is located on a wall that defines a housing that hosts the plural components.

4. The system of claim 2, wherein the selected RIS modules is located on a ceiling that defines a housing that hosts the plural components.

5. The system of claim 2, wherein the selected RIS module is directly located on a rack that is not associated with the first and second components.

6. The system of claim 2, wherein the new, wireless, direct line communication link extends entirely within a housing that hosts the plural components.

7. The system of claim 1, wherein the first component is a first server and the second component is a second server, different from the first server.

8. The system of claim 1, wherein the first component is top-of-rack switch of a first rack and the second component is a top-of-rack switch of a second rack.

9. The system of claim 1, wherein the first component is top-of-rack switch of a first rack and the second component is a core switch.

10. The system of claim 1, wherein the first component is a first core switch and the second component is a second core switch.

11. The system of claim 1, wherein the RIS module includes plural atoms, each atom including a diode and graphene.

12. The system of claim 11, wherein the local controller is configured to control a current through the diode of each atom so that the graphene of the atom emits the second electromagnetic signal along a direction requested by the global controller.

13. A method for establishing a new, wireless, direct line communication link within a data center system, the method comprising:
determining in a global controller that a data exchange bandwidth between first and second components of the data center system is above a given threshold, wherein the first and second components include core switches and racks $R_i$, each rack $R_i$ having plural servers;
calculating an end direction of the new, wireless, direct line communication link between the first and second components;
selecting a plural reconfigurable intelligent surface, RIS, module from plural RIS modules distributed around the first and second components, based on calculations performed by the global controller, to support the new, wireless, direct line communication link; and
configuring the selected RIS module with a local controller so that a received first electromagnetic signal from the first component is reemitted as a second electromagnetic signal toward the second component, the second electromagnetic signal carrying a same information as the first electromagnetic signal.

14. The method of claim 13, wherein the selected RIS module is located on a wall that defines a housing that hosts the plural components or on a ceiling of the housing.

15. The method of claim 13, wherein the selected RIS module is directly located on a rack that is not associated with the first and second components.

16. The method of claim 13, wherein the first component is a first server and the second component is a second server, different from the first server.

17. The method of claim 13, wherein the first component is top-of-rack switch of a first rack and the second component is a top-of-rack switch of a second rack.

18. The method of claim 13, wherein the first component is a top-of-rack switch of a first rack and the second component is a core switch.

19. The method of claim 13, wherein the first component is a first core switch and the second component is a second core switch.

20. The method of claim 13, wherein the RIS module includes plural atoms, each atom including a diode and graphene, and the local controller is configured to control a current through the diode of each atom so that the graphene of the atom emits the second electromagnetic signal along the direction calculated by the global controller.

* * * * *